(12) United States Patent
Wang et al.

(10) Patent No.: US 11,807,794 B2
(45) Date of Patent: Nov. 7, 2023

(54) LIQUID CRYSTAL ALIGNMENT AGENT AND PREPARATION METHOD THEREOF, LIQUID CRYSTAL ALIGNMENT FILM AND PREPARATION METHOD THEREOF, AND LIQUID CRYSTAL CELL

(71) Applicant: SHENZHEN DALTON ELECTRONIC MATERIAL CO., LTD, Shenzhen (CN)

(72) Inventors: Shenglin Wang, Shenzhen (CN); Houming Li, Shenzhen (CN); Jianghua Su, Shenzhen (CN)

(73) Assignee: SHENZHEN DALTON ELECTRONIC MATERIAL CO., LTD, Shenzhen (CN)

( * ) Notice: Subject to any disclaimer, the term of this patent is extended or adjusted under 35 U.S.C. 154(b) by 70 days.

(21) Appl. No.: 17/772,567

(22) PCT Filed: Oct. 22, 2021

(86) PCT No.: PCT/CN2021/125583
§ 371 (c)(1),
(2) Date: Apr. 28, 2022

(87) PCT Pub. No.: WO2022/095722
PCT Pub. Date: May 12, 2022

(65) Prior Publication Data
US 2023/0167365 A1 Jun. 1, 2023

(30) Foreign Application Priority Data
Nov. 3, 2020 (CN) .......................... 202011210131.4

(51) Int. Cl.
*G02F 1/1337* (2006.01)
*G02F 1/1339* (2006.01)
*C09K 19/56* (2006.01)
*C08G 73/10* (2006.01)
*C08J 5/18* (2006.01)

(52) U.S. Cl.
CPC .......... *C09K 19/56* (2013.01); *C08G 73/1032* (2013.01); *C08G 73/1042* (2013.01); *C08G 73/1078* (2013.01); *C08J 5/18* (2013.01); *G02F 1/133711* (2013.01); *G02F 1/133784* (2013.01); *C08J 2379/08* (2013.01); *G02F 1/1339* (2013.01); *G02F 1/13392* (2013.01); *G02F 2202/28* (2013.01)

(58) Field of Classification Search
CPC ................. G02F 1/1333; G02F 1/1337; G02F 1/133711; G02F 1/133723; G02F 1/133784; G02F 1/1339; G02F 1/13392; G02F 2202/28; C08J 5/18; C08J 2379/08; C08G 73/1032; C08G 73/1042; C08G 73/1078; C08G 73/1085; C08G 73/107; C08G 2250/00; C09K 19/56
See application file for complete search history.

(56) References Cited

U.S. PATENT DOCUMENTS

2015/0323837 A1* 11/2015 Uesaka ............. G02F 1/133723
349/123

FOREIGN PATENT DOCUMENTS

| CN | 101608124 A | 12/2009 |
|---|---|---|
| CN | 101921597 A | 12/2010 |
| CN | 101935533 A | 1/2011 |
| CN | 105263925 A | 1/2016 |
| CN | 105940039 A | 9/2016 |
| CN | 112266478 A | 1/2021 |
| CN | 112778521 A | 5/2021 |
| JP | 2012193167 A | 10/2012 |
| JP | 2013010889 A | 1/2013 |

* cited by examiner

*Primary Examiner* — Thoi V Duong
(74) *Attorney, Agent, or Firm* — Bayramoglu Law Offices LLC

(57) ABSTRACT

A liquid crystal alignment agent and a preparation method thereof, a liquid crystal alignment film and a preparation method thereof, and a liquid crystal cell are provided. A piperazine monomer is added to a liquid crystal alignment agent, a bulk resistance value and a surface resistance value of a liquid crystal alignment agent material can be reduced, and the ability of the liquid crystal alignment agent material to release residual charges can be effectively improved, thereby increasing the reliability and stability of an electronic product. The liquid crystal cell using the liquid crystal alignment agent has advantages such as high voltage holding ratio (VHR) and low residual voltage.

32 Claims, No Drawings

LIQUID CRYSTAL ALIGNMENT AGENT AND PREPARATION METHOD THEREOF, LIQUID CRYSTAL ALIGNMENT FILM AND PREPARATION METHOD THEREOF, AND LIQUID CRYSTAL CELL

CROSS REFERENCE TO THE RELATED APPLICATIONS

This application is the national phase entry of International Application No. PCT/CN2021/125583, filed on Oct. 22, 2021, which is based upon and claims priority to Chinese Patent Application No. 202011210131.4, filed on Nov. 3, 2020, the entire contents of which are incorporated herein by reference.

TECHNICAL FIELD

The present disclosure relates to the field of liquid crystal alignment agents, and in particular to a liquid crystal alignment agent and a preparation method thereof, a liquid crystal alignment film and a preparation method thereof, and a liquid crystal cell.

BACKGROUND

With the development of display techniques, liquid crystal displays (LCDs) are widely used in various consumer electronic products such as mobile phones, televisions (TVs), personal digital assistants (PDAs), digital cameras, notebook computers, and desktop computers because LCDs have the advantages such as high image quality, energy conservation, thin body, and wide application range. Currently, LCDs have become the mainstream of display devices.

However, in the existing LCDs, there is a problem of charge accumulation, which leads to problems such as electrostatic residue, electrostatic damage, lowering the signal transmission speed, image persistence, afterimage, and poor reliability under high temperature and high humidity for a long time.

SUMMARY

The present disclosure is intended to provide a liquid crystal alignment agent and a preparation method thereof, a liquid crystal alignment film and a preparation method thereof, and a liquid crystal cell, such as to avoid charge accumulation of LCDs.

In order to achieve the above objective, the present disclosure provides a liquid crystal alignment agent, including a diamine monomer, a dianhydride monomer, a piperazine monomer, and a solvent, where the piperazine monomer has a general structural formula of

where R represents an amino group or an anhydride group.

It can be understood that the amino group refers to an organic compound obtained by replacing a hydrogen atom of ammonia by an alkyl group. The anhydride group refers to an anhydride group of an organic acid, which is a compound generated by the shrinkage of two monobasic acid molecules or one dibasic acid molecule.

It can be understood that, when R is an amino group, the piperazine monomer constitutes a diamine with a piperazine structure; and when R is an anhydride group, the piperazine monomer constitutes a dianhydride with a piperazine structure.

It can be understood that the diamine monomer and the dianhydride monomer in the liquid crystal alignment agent, after being mixed, will react to generate polyamic acid (PAA), and thus the liquid crystal alignment agent is a viscous and transparent PAA solution.

In some embodiments of the present disclosure, a molar ratio of the piperazine monomer to the diamine monomer may be (1-100):100; and preferably, the piperazine monomer may include one or more from the group consisting of compounds shown in the following structural formulas:

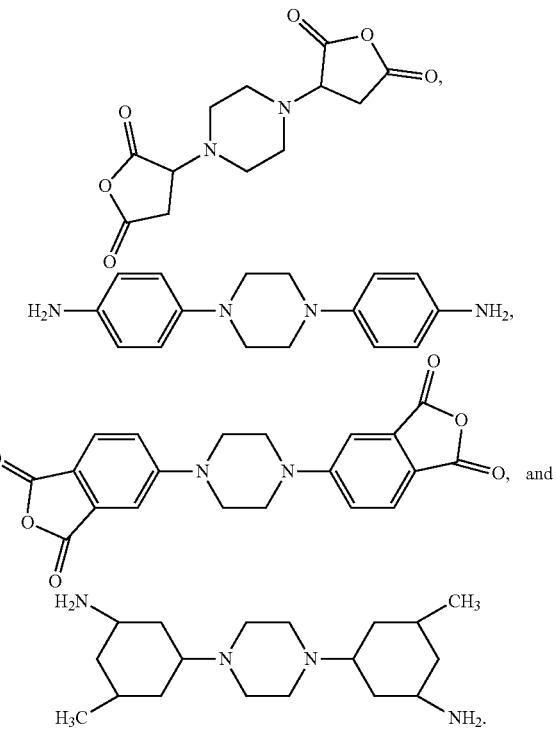

In some embodiments of the present disclosure, the diamine monomer may include a first diamine compound and a second diamine compound:

the first diamine compound may include at least one from the group consisting of compounds shown in general structural formulas I and II:

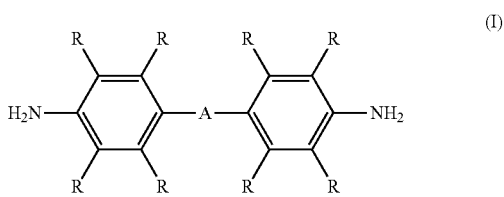

in general structural formula I, A represents a chemical bond, an alkyl chain $C_nH_{2n}$, —O—, NH—, —S—, or —SO$_2$—, where n=1-20: and R represents —H or —CH$_3$;

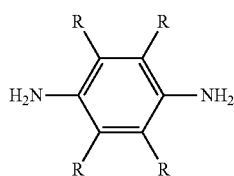

(II)

in general structural formula II, R represents —H or —CH$_3$; and the second diamine compound may include at least one from the group consisting of compounds shown in general structural formulas III and IV:

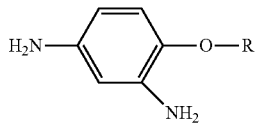

(III)

in general structural formula III, R represents an alkyl chain C$_n$H$_{(2n+1)}$, where n=1-50.

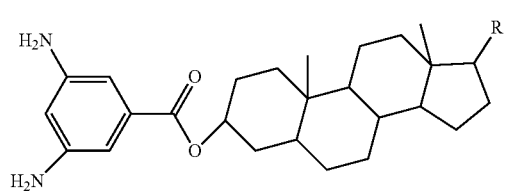

(IV)

in general structural formula IV, R represents an alkyl chain C$_n$H$_{(2n+1)}$, where n=1-50.

In some embodiments of the present disclosure, a mole number of the first diamine compound may account for 0.01% to 99.9%, preferably 10% to 99.9%, and more preferably 50% to 99.9% of a total mole number of the diamine monomer;

preferably, the first diamine compound may include one or more from the group consisting of the following compounds:

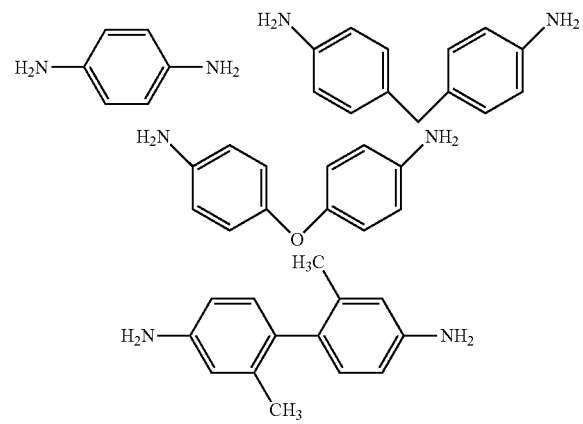

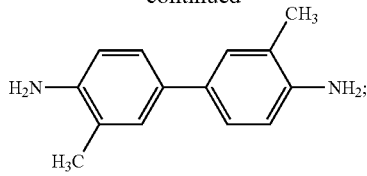

and preferably, the second diamine compound may include one or more from the group consisting of the following compounds:

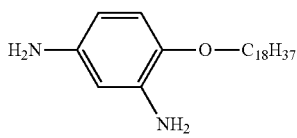

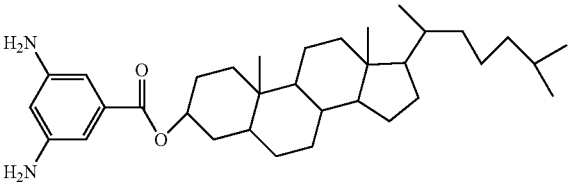

.

The first diamine compound is a basis for synthesizing the liquid crystal alignment agent material, which enables a liquid crystal cell to have basic electrical properties. The second diamine compound can impart alignment properties to the liquid crystal alignment agent material; and the liquid crystal alignment agent material resulting from the reaction can achieve liquid crystal alignment after being rubbed, such that the liquid crystal cell has a specified pretilt angle.

In some embodiments of the present disclosure, the liquid crystal alignment agent may have a solid content of 1% to 10%, preferably, a molar ratio of the diamine monomer to the dianhydride monomer may be (80-100):(80-100), preferably (90-100):(90-100), and more preferably 100:100;

preferably, the solvent may include one or more from the group consisting of N,N-dimethylformamide (DMF), NN-dimethylacetamide (DMA), dimethyl sulfoxide (DMSO), N-methylpyrrolidone (NMP), m-cresol, tetrahydrofuran (THF), and other polar aprotic solvents;

preferably, the liquid crystal alignment agent may further include a leveling agent, and the leveling agent may include one or more from the group consisting of ethyl acetate, 2-butoxyethanol, diethylene glycol diethyl ether, diacetone alcohol (DAA), and 2-butoxyethyl acetate; and preferably, in the liquid crystal alignment agent, the leveling agent may be added at an amount of 0 wt % to 80 wt %.

The present disclosure also provides a preparation method of the liquid crystal alignment agent described above, including: mixing raw materials including the diamine monomer, the dianhydride monomer, the piperazine monomer, and the solvent to allow a reaction.

Optionally, the reaction may be conducted at −15° C. to 100° C. preferably 0° C. to 80° C., and more preferably 20° C. to 60° C.

Optionally, the reaction may be conducted for 0.5 h to 48 h, preferably 1 h to 24 h, and more preferably 2 h to 12 h.

Preferably, the mixing to allow a reaction may be conducted in a protective atmosphere; and preferably, the protective atmosphere may be argon or nitrogen.

Preferably, a system obtained after the reaction may have a solid content of 10°% to 50%, preferably 12% to 40%, and more preferably 15% to 30%.

Preferably, the preparation method may further include: adding the leveling agent to a system obtained after the reaction.

Preferably, the preparation method may further include: further adding the solvent to a system obtained after the reaction to dilute the system; and preferably, a diluted system may have a solid content of 1% to 10%.

The present disclosure also provides a preparation method of a liquid crystal alignment film, including: subjecting the liquid crystal alignment agent described above to film-forming and curing to obtain the liquid crystal alignment film.

In some embodiments of the present disclosure, the film-forming may include: coating the liquid crystal alignment agent on a substrate, and baking to remove the solvent, and preferably, the baking may be conducted at 60° C. to 120° C. for 10 min to 20 min:

preferably, the curing may include: subjecting a substrate obtained after the film-forming to an imidization treatment at 200° C. to 250° C. preferably for 30 min to 90 min; and preferably, the preparation method may further include: rubbing a film obtained after the curing.

The present disclosure also provides a liquid crystal alignment film prepared by the preparation method of a liquid crystal alignment film described above.

The present disclosure also provides a liquid crystal cell, including a first substrate and a second substrate that are arranged opposite to each other, and a liquid crystal material arranged between the first substrate and the second substrate, where the liquid crystal alignment film described above is arranged at each of a side of the first substrate in contact with the liquid crystal material and a side of the second substrate in contact with the liquid crystal material.

Preferably, the first substrate may be in sealed connection with the second substrate through an adhesive, and preferably, the adhesive may include a light-curing adhesive and/or a heat-curing adhesive.

Preferably, spacer particles may be admixed in the adhesive; and the spacer particles may each have a particle size of preferably 1 gun to 20 μm and more preferably 3 gun to 20 μm.

The spacer particles are provided to make a specified gap formed between the first substrate and the second substrate to accommodate the liquid crystal material.

In some embodiments of the present disclosure, the first substrate and the second substrate may be each an indium tin oxide (ITO) glass substrate.

The present disclosure has the following beneficial effects:

In the present disclosure, by adding a piperazine monomer to a liquid crystal alignment agent, a bulk resistance value and a surface resistance value of a liquid crystal alignment agent material can be reduced and the ability of the liquid crystal alignment agent material to release residual charges can be effectively improved, thereby increasing the reliability and stability of an electronic product. The liquid crystal cell using the liquid crystal alignment agent of the present disclosure has advantages such as high voltage holding ratio (VHR) and low residual voltage (RDC).

The liquid crystal alignment agent of the present disclosure can be applied to various types of LCDs such as a twisted nematic (TN) LED and a vertical alignment (VA) LED.

DETAILED DESCRIPTION OF THE EMBODIMENTS

Terms used herein:

"Prepared by . . . " is synonymous with "comprising". The terms "include", "comprise", "have", "including", or any other variations thereof used herein refer to non-exclusive inclusion. For example, a composition, step, method, article, or device including listed elements is not necessarily limited to those elements, but may include other elements not explicitly listed or inherent elements in such a composition, step, method, article, or device.

The conjunction "consisting of" excludes any unspecified element, step, or component. When used in the claims, this phrase will make a claim closed and exclude materials other than those described (except for conventional impurities associated therewith). When the phrase "consisting of" appears in a clause of a subject of a claim rather than immediately following the subject, it restricts only elements described in this clause; and other elements are not excluded from the claim as a whole.

When an amount, concentration, or other value or parameter is expressed in a range, a preferred range, or a range defined by a series of upper and lower preferred values, it should be understood that all ranges formed by any pair of an upper limit or preferred value of any range with a lower limit or preferred value of any range are specifically disclosed, regardless of whether the ranges are independently disclosed. For example, when a range of "1 to 5" is disclosed, the described range should be interpreted as including the ranges of "1 to 4", "1 to 3", "1 to 2", "1 to 2 and 4 to 5", "1 to 3 and 5", and the like. When a numerical range is described herein, unless otherwise stated, the range is intended to include its end values and all integers and fractions within the range.

In these embodiments, unless otherwise indicated, the stated parts and percentages are each based on a mass.

"Part by mass" refers to a basic unit of measurement that represents a mass ratio relationship among multiple components, for example, 1 part can represent any unit mass, such as 1 g and 2.689 g. If there are a parts by mass of a component A and b parts by mass of a component B, it means that a mass ratio of the component A to the component B is a: b, or a mass of the component A is aK and a mass of the component B is bK (K is an arbitrary number, representing a multiplying factor). It should be understood that, unlike the mass fraction, the total parts by mass of all components are not limited to 100 parts.

"And/or" is intended to indicate that one or both of the stated conditions may occur, for example, A and/or B includes (A and B) and (A or B).

Embodiments of the present disclosure will be described in detail below with reference to specific examples, but those skilled in the art will understand that the following examples are only used to illustrate the present disclosure and should not be regarded as limiting the scope of the present disclosure. If no specific conditions are specified in the examples, the example will be conducted according to conventional conditions or the conditions recommended by the manufacturer. All of the used reagents or instruments which are not specified with manufacturers are conventional commercially-available products.

The monomers used in the examples and comparative examples of the present disclosure are as follows:

DA-1: cannabidiolic acid (CBDA), with a structural formula of

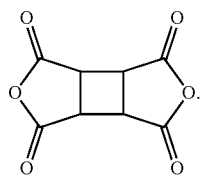 [SMILES: O=C1OC(=O)C2C1C1C(=O)OC(=O)C21]

DA-2:3,3-(piperazine-1,4-diyl) dianhydride, with a structural formula of

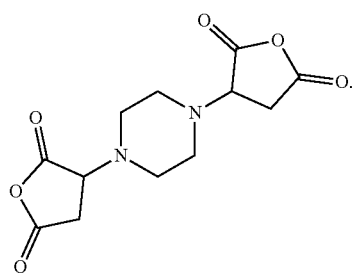 [SMILES: O=C1CC(N2CCN(C3CC(=O)OC3=O)CC2)C(=O)O1]

DA-3:3,3-(piperazine-1,4-diyl) diphthalic anhydride, with a structural formula of

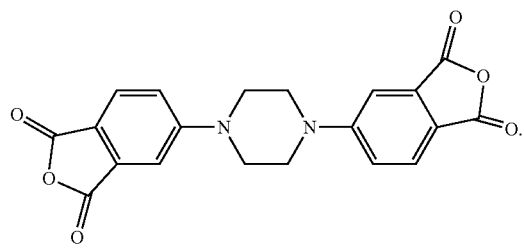 [SMILES: O=C1OC(=O)c2cc(N3CCN(c4ccc5c(c4)C(=O)OC5=O)CC3)ccc21]

DN-1: paraphenylenediamine (PPD), with a structural formula of

UN-2:24-diaminobenzene octadecyl ether, with a structural formula of

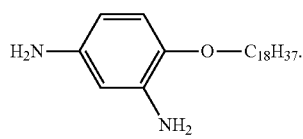

DN-3: dihydrocholesterol-3,5-diaminobenzoate, with a structural formula of

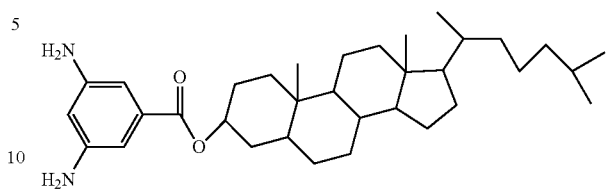

DN-4:1,4-bis(4-aminophenyl)piperazine with a structural formula of

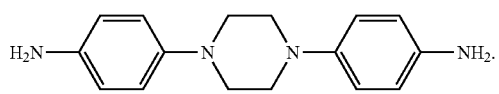 [SMILES: Nc1ccc(N2CCN(c3ccc(N)cc3)CC2)cc1]

DN-5:1,4-bis 3-meth 1-5-aminocyclohexyl)piperazine with a structural formula of

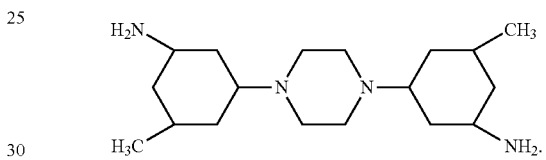

Example 1

(1) Preparation of a PAA liquid crystal alignment agent

Under a nitrogen atmosphere at room temperature, 6.48 g (0.06 mol) of DN-1, 3.76 g (0.01 mol) of DN-2, 8.04 g (0.03 mol) of DN-4, and 88.4 g of NMP were sequentially added and stirred at room temperature for 30 min until all solid materials were completely dissolved; then 19.6 g (0.1 mol) of DA-1 was added, and a resulting mixture was stirred at room temperature for 3 h to allow a reaction until a resulting reaction solution had a solid content of 30%; and after the ruction was completed, a resulting reaction solution was diluted with 208.3 g of NMP and 296.7 g of BC to obtain a transparent and viscous PAA solution, where the transparent and viscous PAA solution had a solid content of 6% and an NMP-BC solvent ratio was 50/50.

(2) Preparation of a liquid crystal alignment film and a liquid crystal cell

The PAA liquid crystal alignment agent solution prepared according to the above preparation method was evenly spin-coated on a clean ITO glass substrate, then the ITO glass substrate was pre-baked at 60° C. to 120° C. for 10 min to 20 min and then subjected to an imidization treatment at 200° C. to 250° C. for 30 min to 90 mm, and a resulting polyimide (PI) film on the ITO glass substrate was rubbed with a rubbing machine at a rubbing angle of 45° to obtain the liquid crystal alignment film coated on the ITO glass substrate. Two ITO glass substrates each coated with the liquid crystal alignment film prepared above were bonded using a heat-curing adhesive with 4 μm spacer particles in a way that allows rubbing surfaces of the two substrates to be opposite and allows rubbing directions of the two substrates to be opposite to obtain a cell, then a liquid crystal was poured into the cell, and the cell was sealed with a light-curing adhesive to obtain the liquid crystal cell.

Example 2

(1) Preparation of a PAA liquid crystal alignment agent

Under a nitrogen atmosphere at room temperature, 9.72 g (0.09 mol) of DN-1, 3.76 g (0.01 mol) of DN-2, and 83.2 g of NMP were sequentially added and stirred at room temperature for 30 min until all solid materials were completely dissolved; then 13.72 g (0.07 mol) of DA-1 and 8.46 g (0.03 mol) of DA-3 were sequentially added, and a resulting mixture was stirred at room temperature for 3 h to allow a reaction until a resulting reaction solution had a solid content of 30%; and after the reaction was completed, a resulting reaction solution was diluted with 196.1 g of NMP and 279.3 g of BC to obtain a transparent and viscous PAA solution, where the transparent and viscous PAA solution had a solid content of 6% and an NMP/BC solvent ratio was 50/50.

(2) Preparation of a liquid crystal alignment film and a liquid crystal cell The PAA liquid crystal alignment agent solution prepared according to the above preparation method was evenly spin-coated on a clean ITO glass substrate, then the ITO glass substrate was pre-baked at 60° C. to 120° C. for 10 min to 20 min and then subjected to an imidization treatment at 200° C. to 250° C. for 30 min to 90 min, and a resulting PI film on the ITO glass substrate was rubbed with a rubbing machine at a rubbing angle of 45° to obtain the liquid crystal alignment film coated on the ITO glass substrate. Two ITO glass substrates each coated with the liquid crystal alignment film prepared above were bonded using a heat-curing adhesive with 4 μm spacer particles in a way that allows rubbing surfaces of the two substrates to be opposite and allows rubbing directions of the two substrates to be orthogonal to obtain a cell, then a liquid crystal was poured into the cell, and the cell was sealed with a light-curing adhesive to obtain the liquid crystal cell.

Example 3

(1) Preparation of a PAA liquid crystal alignment agent

Under a nitrogen atmosphere at room temperature, 5.4 g (0.05 mol) of DN-1, 10.44 g (0.02 mol) of DN-3, 8.04 g (0.03 mol) of DN-4, and 101.4 g of NMP were sequentially added and stirred at room temperature for 30 min until all solid materials were completely dissolved; then 19.6 g (0.1 mol) of DA-1 was added, and a resulting mixture was stirred at room temperature for 3 h to allow a reaction until a resulting reaction solution had a solid content of 30°%; and after the reaction was completed, a resulting reaction solution was diluted with 239.1 g of NMP and 340.6 g of BC to obtain a transparent and viscous PAA solution, where the transparent and viscous PAA solution had a solid content of 6% and an NMP/BC solvent ratio was 50/50.

(2) Preparation of a liquid crystal alignment film and a liquid crystal cell The PAA liquid crystal alignment agent solution prepared according to the above preparation method was evenly spin-coated on a clean ITO glass substrate, then the ITO glass substrate was pre-baked at 60° C. to 120° C. for 10 min to 20 min and then subjected to an imidization treatment at 200° C. to 250° C. for 30 min to 90 min, and a resulting PI film on the ITO glass substrate was rubbed with a rubbing machine at a rubbing angle of 0° to obtain the liquid crystal alignment film coated on the ITO glass substrate. Two ITO glass substrates each coated with the liquid crystal alignment film prepared above were bonded using a heat-curing adhesive with 4 μm spacer particles in a way that allows rubbing surfaces of the two substrates to be opposite and allows rubbing directions of the two substrates to be opposite to obtain a cell, then a liquid crystal was poured into the cell, and the cell was sealed with a light-curing adhesive to obtain the liquid crystal cell.

Example 4

(1) Preparation of a PAA liquid crystal alignment agent

Under a nitrogen atmosphere at room temperature, 8.64 g (0.08 mol) of DN-1, 10.44 g (0.02 mol) of DN-3, and 96.3 g of NMP were sequentially added and stirred at room temperature for 30 min until all solid materials were completely dissolved; then 13.72 g (0.07 mol) of DA-1 and 8.46 g (0.03 mol) of DA-3 were sequentially added, and a resulting mixture was stirred at room temperature for 3 h to allow a reaction until a resulting reaction solution had a solid content of 30%; and after the ruction was completed, a resulting reaction solution was diluted with 226.9 g of NNW and 323.2 g of BC to obtain a transparent and viscous PAA solution, where the transparent and viscous PAA solution had a solid content of 6% and an NMP/BC solvent ratio was 50/50.

(2) Preparation of a liquid crystal alignment film and a liquid crystal cell The PAA liquid crystal alignment agent solution prepared according to the above preparation method was evenly spin-coated on a clean ITO glass substrate, then the ITO glass substrate was pre-baked at 60° C. to 120° C. for 10 min to 20 min and then subjected to an imidization treatment at 200° C. to 250° C. for 30 min to 90 min, and a resulting PI film on the ITO glass substrate was rubbed with a rubbing machine at a rubbing angle of 0° to obtain the liquid crystal alignment film coated on the ITO glass substrate. Two ITO glass substrates each coated with the liquid crystal alignment film prepared above were bonded using a heat-curing adhesive with 4 μm spacer particles in a way that allows rubbing surfaces of the two substrates to be opposite and allows rubbing directions of the two substrates to be opposite to obtain a cell, then a liquid crystal was poured into the cell, and the cell was sealed with a light-curing adhesive to obtain the liquid crystal cell.

Example 5

(1) Preparation of a PAA liquid crystal alignment agent

Under a nitrogen atmosphere at room temperature, 6.48 g (0.06 mol) of DN-1, 3.76 g (0.01 mol) of DN-2, 9.24 g (0.03 mol) of DN-5, and 91.2 g of NMP were sequentially added and stirred at room temperature for 30 min until all solid materials were completely dissolved; then 19.6 g (0.1 mol)

of DA-1 was added, and a resulting mixture was stirred at room temperature for 3 h to allow a reaction until a resulting reaction solution had a solid content of 30%; and after the reaction was completed, a resulting ruction solution was diluted with 214.9 g of NMP and 306.1 g of BC to obtain a transparent and viscous PAA solution, where the transparent and viscous PAA solution had a solid content of 6% and an NMP/BC solvent ratio was 50/50.

(2) Preparation of a liquid crystal alignment film and a liquid crystal cell

The PAA liquid crystal alignment agent solution prepared according to the above preparation method was evenly spin-coated on a clean ITO glass substrate, then the ITO glass substrate was pre-baked at 60° C. to 120° C. for 10 min to 20 min and then subjected to an imidization treatment at 200° C. to 250° C. for 30 min to 90 min, and a resulting PI film on the ITO glass substrate was rubbed with a rubbing machine at a rubbing angle of 45° to obtain the liquid crystal alignment film coated on the ITO glass substrate. Two ITO glass substrates each coated with the liquid crystal alignment film prepared above were bonded using a heat-curing adhesive with 4 μm spacer particles in a way that allows rubbing surfaces of the two substrates to be opposite and allows rubbing directions of the two substrates to be opposite to obtain a cell, then a liquid crystal was poured into the cell, and the cell was sealed with a light-curing adhesive to obtain the liquid crystal cell.

Example 6

(1) Preparation of a PAA liquid crystal alignment agent

Under a nitrogen atmosphere at room temperature, 9.72 g (0.09 mol) of DNA, 3.76 g (0.01 mol) of DN-2, and 89.9 g of NMP were sequentially added and stirred at room temperature for 30 min until all solid materials were completely dissolved; then 13.72 g (0.07 mol) of DA-1 and 11.34 g (0.03 mol) of DA-3 were sequentially added, and a resulting mixture was stirred at room temperature for 3 h to allow a reaction until a resulting reaction solution had a solid content of 30%, and after the reaction was completed, a resulting reaction solution was diluted with 212.0 g of NMP and 301.9 g of BC to obtain a transparent and viscous PAA solution, where the transparent and viscous PAA solution had a solid content of 6% and an NMP/BC solvent ratio was 50/50.

(2) Preparation of a liquid crystal alignment film and a liquid crystal cell

The PAA liquid crystal alignment agent solution prepared according to the above preparation method was evenly spin-coated on a clean ITO glass substrate, then the ITO glass substrate was pre-baked at 60° C. to 120° C. for 10 min to 20 min and then subjected to an imidization treatment at 200° C. to 250° C. for 30 min to 90 min, and a resulting PI film on the ITO glass substrate was rubbed with a rubbing machine at a rubbing angle of 45° to obtain the liquid crystal alignment film coated on the ITO glass substrate. Two ITO glass substrates each coated with the liquid crystal alignment film prepared above were bonded using a heat-curing adhesive with 4 μm spacer particles in a way that allows rubbing surfaces of the two substrates to be opposite and allows rubbing directions of the two substrates to be orthogonal to obtain a cell, then a liquid crystal was poured into the cell, and the cell was sealed with a light-curing adhesive to obtain the liquid crystal cell.

Example 7

(1) Preparation of a PAA liquid crystal alignment agent

Under a nitrogen atmosphere at room temperature, 5.4 g (0.05 mol) of DN-1, 10.44 g (0.02 mol) of DN-3, 9.24 g (0.03 mol) of DN-5, and 104.3 g of NMP were sequentially added and stirred at room temperature for 30 min until all solid materials were completely dissolved; then 19.6 g (0.1 mol) of DA-1 was added, and a resulting mixture was stirred at room temperature for 3 h to allow a reaction until a resulting reaction solution had a solid content of 30%; and after the ruction was completed, a resulting reaction solution was diluted with 245.7 g of NMP and 350.0 g of BC to obtain a transparent and viscous PAA solution, where the transparent and viscous PAA solution had a solid content of 6% and an NMP/BC solvent ratio was 50/50.

(2) Preparation of a liquid crystal alignment film and a liquid crystal cell

The PAA liquid crystal alignment agent solution prepared according to the above preparation method was evenly spin-coated on a clean ITO glass substrate, then the ITO glass substrate was pre-baked at 60° C. to 120° C. for 10 min to 20 min and then subjected to an imidization treatment at 200° C. to 250° C. for 30 min to 90 min, and a resulting PI film on the ITO glass substrate was rubbed with a rubbing machine at a rubbing angle of 0° to obtain the liquid crystal alignment film coated on the ITO glass substrate. Two ITO glass substrates each coated with the liquid crystal alignment film prepared above were bonded using a heat-curing adhesive with 4 μm spacer particles in a way that allows rubbing surfaces of the two substrates to be opposite and allows rubbing directions of the two substrates to be opposite to obtain a cell, then a liquid crystal was poured into the cell, and the cell was sealed with a light-curing adhesive to obtain the liquid crystal cell.

Example 8

(1) Preparation of a PAA liquid crystal alignment agent

Under a nitrogen atmosphere at room temperature, 8.64 g (0.08 mol) of DN-1, 10.44 g (0.02 mol) of DN-3, and 103.0 g of NMP were sequentially added and stirred at room temperature for 30 min until all solid materials were completely dissolved; then 13.72 g (0.07 mol) of DA-1 and 11.34 g (0.03 mol) of DA-3 were sequentially added, and a resulting mixture was stirred at room temperature for 3 h to allow a reaction until a resulting reaction solution had a solid content of 30%; and after the reaction was completed, a resulting reaction solution was diluted with 242.8 g of NMP and 345.8 g of BC to obtain a transparent and viscous PAA solution, where the transparent and viscous PAA solution had a solid content of 6% and an NMP/BC solvent ratio was 50/50.

(2) Preparation of a liquid crystal alignment film and a liquid crystal cell

The PAA liquid crystal alignment agent solution prepared according to the above preparation method was evenly spin-coated on a clean ITO glass substrate, then the ITO glass substrate was pre-baked at 60° C. to 120° C. for 10 min to 20 min and then subjected to an imidization treatment at 200° C. to 250° C. for 30 min to 90 min, and a resulting PI film on the ITO glass substrate was rubbed with a rubbing machine at a rubbing angle of 0° to obtain the liquid crystal alignment film coated on the ITO glass substrate. Two ITO glass substrates each coated with the liquid crystal alignment film prepared above were bonded using a heat-curing adhesive with 4 μm spacer particles in a way that allows rubbing surfaces of the two substrates to be opposite and allows rubbing directions of the two substrates to be opposite to obtain a cell, then a liquid crystal was poured into the cell, and the cell was sealed with a light-curing adhesive to obtain the liquid crystal cell.

Comparative Example 1

(1) Preparation of a PAA liquid crystal alignment agent

Under a nitrogen atmosphere at room temperature, 9.72 g (0.09 mol) of DN-1, 3.76 g (0.01 mol) of DN-2, and 77.2 g of NMP were sequentially added and stirred at room temperature for 30 min until all solid materials were completely dissolved, then 19.6 g (0.1 mol) of DA-1 was added, and a resulting mixture was stirred at room temperature for 3 h to allow a reaction until a resulting reaction solution had a solid content of 30%; and after the reaction was completed, a resulting reaction solution was diluted with 181.9 g of NMP and 259.1 g of BC to obtain a transparent and viscous PAA solution, where the transparent and viscous PAA solution had a solid content of 6% and an NMP/BC solvent ratio was 50/50.

(2) Preparation of a liquid crystal alignment film and a liquid crystal cell

The PAA liquid crystal alignment agent solution prepared according to the above preparation method was evenly spin-coated on a clean ITO glass substrate, then the ITO glass substrate was pre-baked at 60° C. to 120° C. for 10 min to 20 min and then subjected to an imidization treatment at 200° C. to 250° C. for 30 min to 90 min, and a resulting PI film on the ITO glass substrate was rubbed with a rubbing machine at a rubbing angle of 45° to obtain the liquid crystal alignment film coated on the ITO glass substrate. Two ITO glass substrates each coated with the liquid crystal alignment film prepared above were bonded using a heat-curing adhesive with 4 μm spacer particles in a way that allows rubbing surfaces of the two substrates to be opposite and allows rubbing directions of the two substrates to be orthogonal to obtain a cell, then a liquid crystal was poured into the cell, and the cell was sealed with a light-curing adhesive to obtain the liquid crystal cell.

Comparative Example 2

(1) Preparation of a PAA liquid crystal alignment agent

Under a nitrogen atmosphere at room temperature, 8.64 g (0.08 mol) of DN-1, 10.44 g (0.02 mol) of DN-3, and 90.25 g of NMP were sequentially added and stirred at room temperature for 30 min until all solid materials were completely dissolved: then 19.6 g (0.1 mol) of DA-1 was added, and a resulting mixture was stirred at room temperature for 3 h to allow a reaction until a resulting reaction solution had a solid content of 30%; and after the reaction was completed, a resulting reaction solution was diluted with 212.7 g of NMP and 303.0 g of BC to obtain a transparent and viscous PAA solution, where the transparent and viscous PAA solution had a solid content of 6% and an NMP-BC solvent ratio was 50/50.

(2) Preparation of a liquid crystal alignment film and a liquid crystal cell

The PAA liquid crystal alignment agent solution prepared according to the above preparation method was evenly spin-coated on a clean ITO glass substrate, then the ITO glass substrate was pre-baked at 60° C. to 120° C. for 10 min to 20 min and then subjected to an imidization treatment at 200° C. to 250° C. for 30 min to 90 min, and a resulting PI film on the ITO glass substrate was rubbed with a rubbing machine at a rubbing angle of 45° to obtain the liquid crystal alignment film coated on the ITO glass substrate. Two ITO glass substrates each coated with the liquid crystal alignment film prepared above were bonded using a heat-curing adhesive with 4 μm spacer particles in a way that allows rubbing surfaces of the two substrates to be opposite and allows rubbing directions of the two substrates to be orthogonal to obtain a cell, then a liquid crystal was poured into the cell, and the cell was sealed with a light-curing adhesive to obtain the liquid crystal cell.

Electrical performance test conditions for the liquid crystal cells:

Test device: 6254C;
VHR measurement conditions: voltage: 5 V, pulse width: 60 μs/frame, period: 1,667 ms, and measurement temperature: 60° C.; and
RDC measurement conditions: voltage: 5 V, charging time: 2,400 sec, measurement time: 1,200 sec, and measurement temperature: 60° C.
Pretilt angle test conditions for the liquid crystal cells:
test device: Shintech Optitro-STD (3STN 11);
test wavelength: 591.4 nm; and
test mode: TN/VA mode.
Bulk resistance and surface resistance test conditions for the liquid crystal alignment films:
Test device: electrometer/megameter (KEYSIGHT B2985A): sample thickness: 5 μm to 50 μm; effective area: 30 cm$^2$ to 60 cm$^2$, and test parameters: voltage measurement range: 1 μV to 20 V, measurement resolution: 0.01 fA, and 2,000 readings/s.

TABLE 1

Electrical properties of the liquid crystal cells and bulk resistivities of the liquid crystal alignment films in the comparative examples and examples

| | Formula | Pretilt angle | Electrical properties of liquid crystal cell | | Bulk resistivity (Ω · cm) | Surface resistivity (Ω · cm) |
| --- | --- | --- | --- | --- | --- | --- |
| | | | VHR (%) | RDC (mv) | | |
| Comparative Example 1 | DA-1/DN-1/DN-2 = 100/90/10 | 3.812° | 97.23 | 412 | 6.91E+15 | 7.89E+16 |
| Comparative Example 2 | DA-1/DN-1/DN-3 = 100/80/20 | 89.652° | 97.50 | 287 | 9.36E+15 | 1.07E+17 |

TABLE 1-continued

Electrical properties of the liquid crystal cells and bulk resistivities of the liquid crystal alignment films in the comparative examples and examples

| | Formula | Pretilt angle | Electrical properties of liquid crystal cell | | Bulk resistivity (Ω · cm) | Surface resistivity (Ω · cm) |
| --- | --- | --- | --- | --- | --- | --- |
| | | | VHR (%) | RDC (mv) | | |
| Example 1 | DA-1/DN-1/DN-2/DN-4 = 100/60/10/30 | 3.752° | 98.20 | 41.88 | 6.15E+13 | 5.62E+14 |
| Example 2 | DA-1/DA-2/DN-1/DN-2 = 70/30/90/10 | 3.849° | 98.33 | 36.49 | 3.12E+14 | 4.34E+15 |
| Example 3 | DA-1/DN-1/DN-3/DN-4 = 100/50/20/30 | 89.689° | 97.73 | 61.57 | 8.55E+13 | 8.44E+14 |
| Example 4 | DA-1/DA-2/DN-1/DN-3 = 70/30/80/20 | 89.622° | 97.98 | 64.93 | 4.11E+14 | 3.58E+15 |
| Example 5 | DA-1/DN-1/DN-2/DN-5 = 100/60/10/30 | 3.678° | 98.22 | 56.22 | 3.23E+13 | 3.99E+14 |
| Example 6 | DA-1/DA-3/DN-1/DN-2 = 70/30/90/10 | 3.780° | 99.01 | 63.90 | 7.89E+14 | 7.12E+15 |
| Example 7 | DA-1/DN-1/DN-3/DN-5 = 100/50/20/30 | 89.658° | 98.75 | 70.23 | 2.15E+13 | 2.78E+14 |
| Example 8 | DA-1/DA-3/DN-1/DN-3 = 70/30/80/20 | 89.638° | 98.89 | 68.42 | 9.23E+14 | 8.88E+15 |

It can be seen from Table 1 that the liquid crystal alignment films of the examples of the present disclosure have lower bulk resistivity and surface resistivity than those of the comparative examples, and the liquid crystal cells of the examples of the present disclosure have higher VHR and lower residual voltage (RDC) than those of the comparative examples, indicating that the liquid crystal alignment films prepared in the examples of the present disclosure have the advantages of rapid charge release and the like, and the liquid crystal cells prepared using the liquid crystal alignment films of the present disclosure have high reliability and stability.

Finally, it should be noted that the above examples are merely intended to describe the technical solutions of the present disclosure, rather than to limit the present disclosure. Although the present disclosure is described in detail with reference to the above examples, persons of ordinary skill in the art should understand that modifications may be made to the technical solutions described in the above examples or equivalent replacements may be made to some or all technical features thereof, which do not make the essence of corresponding technical solutions depart from the scope of the technical solutions in the examples of the present disclosure.

In addition, those skilled in the art can understand that, although some examples herein include some features included in other examples but no other features, a combination of features of different examples falls within the scope of the present disclosure and forms a different example. For example, in the claims, any one of the claimed examples can be used in any combination. The information disclosed in this background section is only intended to deepen the understanding of the general background of the present disclosure, and should not be regarded as an acknowledgement or any form of suggestion that this information constitutes the prior art commonly known to those skilled in the art.

What is claimed is:

1. A liquid crystal alignment agent, comprising a diamine monomer, a dianhydride monomer, a piperazine monomer, and a solvent, wherein the piperazine monomer has a general structural formula of

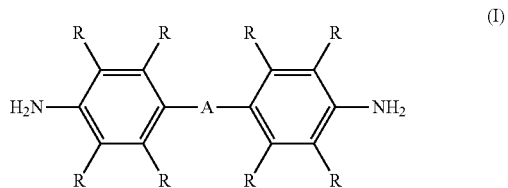

wherein R represents an amino group or an anhydride group;

the diamine monomer comprises a first diamine compound and a second diamine compound;

the first diamine compound comprises at least one from the group consisting of compounds shown in general structural formulas I and II:

(I)

$$\text{H}_2\text{N}\begin{array}{c}\text{R}\quad\text{R}\\\phantom{x}\\\text{R}\quad\text{R}\end{array}\text{—A—}\begin{array}{c}\text{R}\quad\text{R}\\\phantom{x}\\\text{R}\quad\text{R}\end{array}\text{NH}_2$$

in the general structural formula I, A represents a chemical bond, an alkyl chain $C_nH_{2n}$, —O—, —NH—, —S—, or —SO$_2$—, wherein n=1-20; and R represents —H or —CH$_3$;

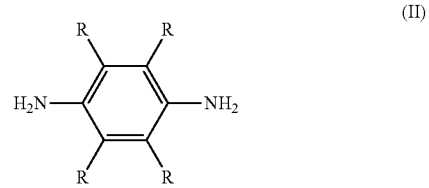

in the general structural formula II, R represents —H or —CH$_3$;

the second diamine compound comprises at least one from the group consisting of compounds shown in general structural formulas III and IV:

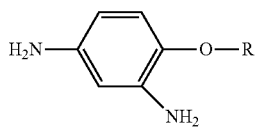

in the general structural formula III, R represents an alkyl chain $C_nH_{(2n+1)}$, wherein n=1-50;

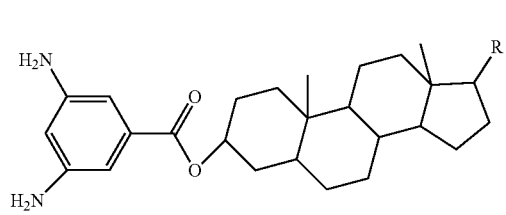

in the general structural formula IV, R represents an alkyl chain $C_nH_{(2n+1)}$, wherein n=1-50.

2. The liquid crystal alignment agent according to claim 1, wherein a molar ratio of the piperazine monomer to the diamine monomer is (1-100):100.

3. The liquid crystal alignment agent according to claim 1, wherein the piperazine monomer comprises one or more from the group consisting of compounds shown in the following structural formulas:

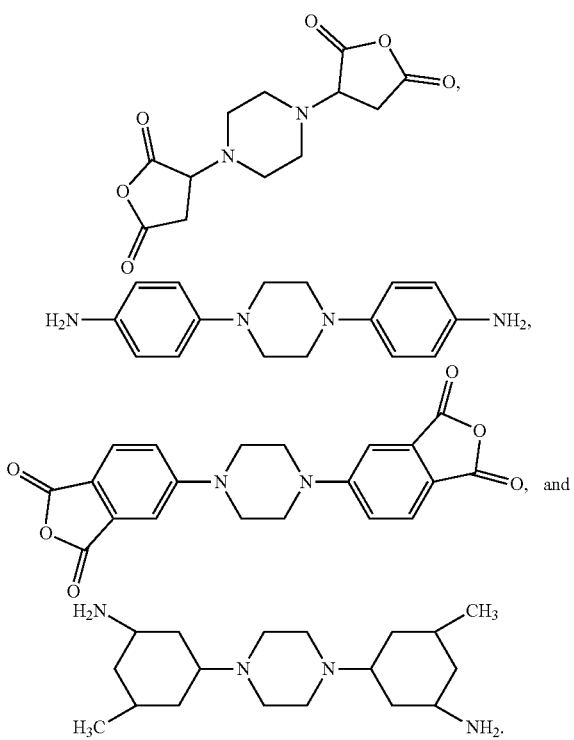

4. The liquid crystal alignment agent according to claim 1, wherein a mole number of the first diamine compound accounts for 0.01% to 99.9% of a total mole number of the diamine monomer.

5. The liquid crystal alignment agent according to claim 4, wherein the mole number of the first diamine compound accounts for 10% to 99.9% of the total mole number of the diamine monomer.

6. The liquid crystal alignment agent according to claim 5, wherein the mole number of the first diamine compound accounts for 50% to 99.9% of the total mole number of the diamine monomer.

7. The liquid crystal alignment agent according to claim 1, wherein the first diamine compound comprises one or more from the group consisting of the following compounds:

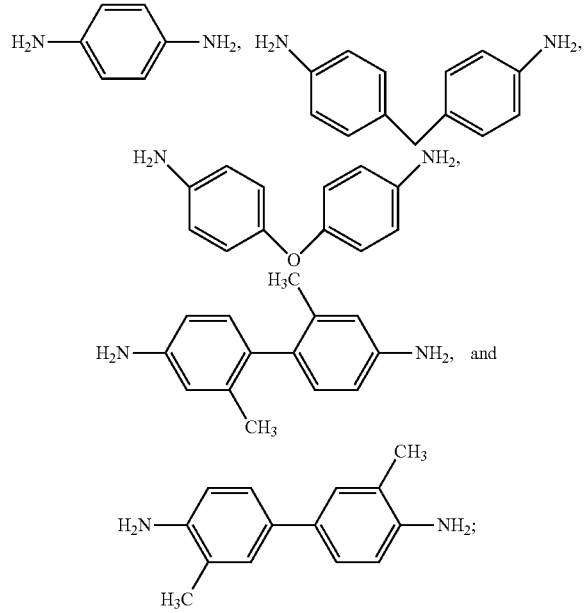

and
the second diamine compound comprises one or more from the group consisting of the following compounds:

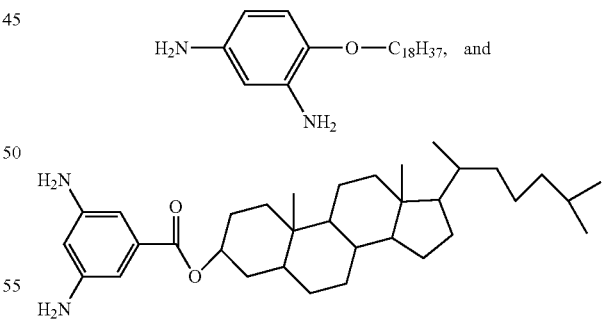

8. The liquid crystal alignment agent according to claim 1, wherein the liquid crystal alignment agent has a solid content of 1% to 10%.

9. The liquid crystal alignment agent according to claim 1, wherein a molar ratio of the diamine monomer to the dianhydride monomer is (80-100):(80-100).

10. The liquid crystal alignment agent according to claim 9, wherein the molar ratio of the diamine monomer to the dianhydride monomer is (90-100):(90-100).

11. The liquid crystal alignment agent according to claim 10, wherein the molar ratio of the diamine monomer to the dianhydride monomer is 100:100.

12. The liquid crystal alignment agent according to claim 1, wherein the solvent comprises one or more from the group consisting of N,N-dimethylformamide (DMF), N,N-dimethylacetamide (DMA), dimethyl sulfoxide (DMSO), N-methylpyrrolidone (NMP), m-cresol, and tetrahydrofuran (THF).

13. The liquid crystal alignment agent according to claim 1, wherein the liquid crystal alignment agent further comprises a leveling agent, and the leveling agent comprises one or more from the group consisting of ethyl acetate, 2-butoxyethanol, diethylene glycol diethyl ether, diacetone alcohol (DAA), and 2-butoxyethyl acetate.

14. The liquid crystal alignment agent according to claim 13, wherein in the liquid crystal alignment agent, the leveling agent is added at an amount of 0 wt % to 80 wt %.

15. A preparation method of the liquid crystal alignment agent according to claim 1, comprising: mixing raw materials comprising the diamine monomer, the dianhydride monomer, the piperazine monomer, and the solvent to allow a reaction.

16. The preparation method according to claim 15, wherein the reaction is conducted at −15° C. to 100° C. for 0.5 h to 48 h.

17. The preparation method according to claim 16, wherein the reaction is conducted at 0° C. to 80° C. for 1 h to 24 h.

18. The preparation method according to claim 17, wherein the reaction is conducted at 20° C. to 60° C. for 2 h to 12 h.

19. The preparation method according to claim 15, wherein the mixing to allow the reaction is conducted in a protective atmosphere, and the protective atmosphere is argon or nitrogen.

20. The preparation method according to claim 15, wherein a system obtained after the reaction has a solid content of 10% to 50%.

21. The preparation method according to claim 20, wherein the system obtained after the reaction has a solid content of 12% to 40%.

22. The preparation method according to claim 21, wherein the system obtained after the reaction has a solid content of 15% to 30%.

23. The preparation method according to claim 15, wherein the preparation method further comprises: adding leveling agent to a system obtained after the reaction.

24. The preparation method according to claim 15, wherein the preparation method further comprises: further adding the solvent to a system obtained after the reaction to dilute the system, wherein a diluted system has a solid content of 1% to 10%.

25. A preparation method of a liquid crystal alignment film, comprising: subjecting the liquid crystal alignment agent according to claim 1 to film-forming and curing to obtain the liquid crystal alignment film.

26. The preparation method according to claim 25, wherein the film-forming comprises: coating the liquid crystal alignment agent on a substrate, and baking to remove the solvent,
wherein the baking is conducted at 60° C. to 120° C. for 10 min to 20 min; and
the curing comprises: subjecting the substrate obtained after the film-forming to an imidization treatment at 200° C. to 250° C. for 30 min to 90 min.

27. The preparation method according to claim 25, wherein the preparation method further comprises: rubbing the liquid crystal alignment film obtained after the curing.

28. A liquid crystal alignment film prepared by the preparation method according to claim 25.

29. A liquid crystal cell, comprising a first substrate, a second substrate and a liquid crystal material, wherein the first substrate and a second substrate are arranged opposite to each other, and the liquid crystal material is arranged between the first substrate and the second substrate, wherein the liquid crystal alignment film according to claim 28 is arranged at each of a side of the first substrate in contact with the liquid crystal material and a side of the second substrate in contact with the liquid crystal material.

30. The liquid crystal cell according to claim 29, wherein the first substrate is in sealed connection with the second substrate through an adhesive.

31. The liquid crystal cell according to claim 30, wherein the adhesive comprises a light-curing adhesive and/or a heat-curing adhesive.

32. The liquid crystal cell according to claim 30, wherein spacer particles are admixed in the adhesive; and the spacer particles each have a particle size of 1 μm to 20 μm.

* * * * *